United States Patent Office 3,138,967
Patented June 30, 1964

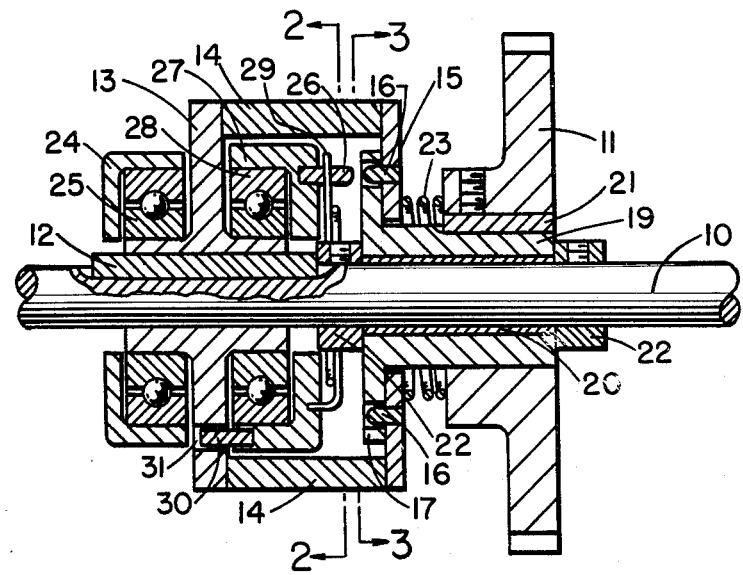
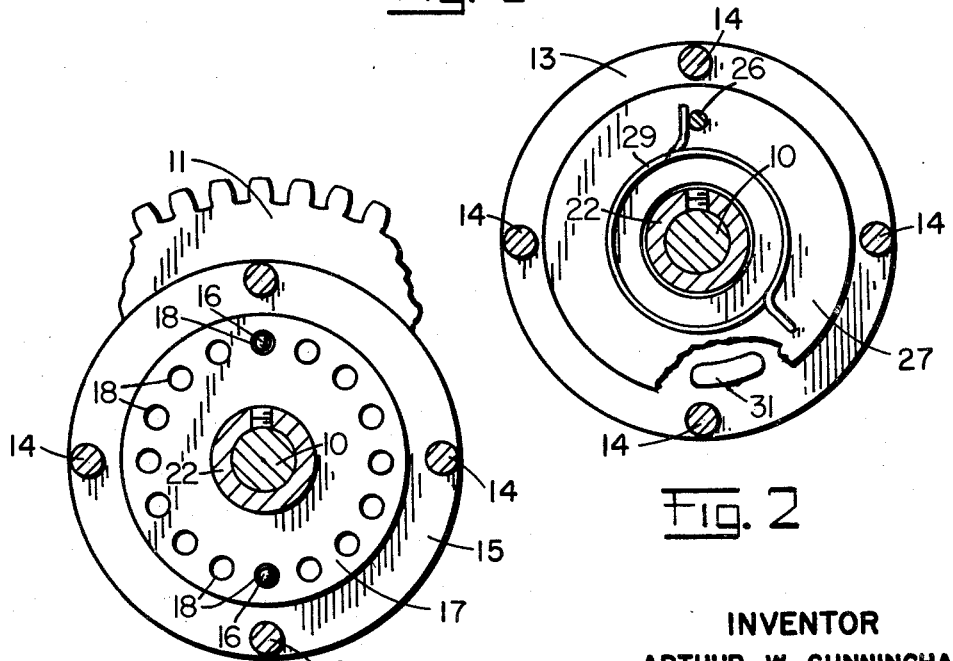

3,138,967
INDEXING MECHANISM
Arthur W. Cunningham, 1151 Seneca Place,
Charlotte, N.C.
Filed Sept. 18, 1962, Ser. No. 224,426
1 Claim. (Cl. 74—400)

This invention relates to indexing devices and included in the objects of this invention are:

First, to provide an indexing mechanism capable of changing the position of a driven member relative to the shaft driving this member while both are rotating and under load, with this indexing being both positive and of a definite amount.

Second, to provide an indexing mechanism which is readily adaptable, during its design and manufacture, to a reasonably wide range of amount of index.

Third, to provide an indexing mechanism which will operate by means of a simple axial movement, easily provided by various manual or mechanical means.

The above and further objects and advantages of the invention will become clear from a consideration of the following detailed description of one practical form of the invention with reference to the accompanying drawings in which:

FIGURE 1 is a longitudinal sectional view of an indexing mechanism made in accordance with the present invention.

FIGURE 2 is a transverse section on the line 2—2 of FIGURE 1.

FIGURE 3 is a transverse section on the line 3—3 of FIGURE 1 with the driven member (in the present form shown as a spur gear) shown fragmentally.

In the drawing 10 indicates a shaft which is driven by external means and 11 the member being driven by the shaft 10. This member 11 is shown as being a spur gear but may be a sprocket, cam or other such device. Fixed by suitable means to the shaft 10 is a driving key 12. Slidable upon shaft 10 and restrained from rotation on said shaft by drive key 12 is the cage spindle 13. On the periphery of the cage spindle 13 and extending parallel to shaft 10 are fixed a plurality of cage spacers 14, with four being shown on the drawing. Rigidly attached to the opposite end of the cage spacers 14 is the drive pin carrier 15 which has a plurality of integrally attached drive pins 16 projecting axially toward the cage spindle 13. A hole plate 17 has a plurality of holes 18 in which the drive pins 16 engage. The angular spacing of the holes 18 determine the exact amount that the device will index in one operation. The angular spacing shown in the drawing is 22½° and therefore sixteen holes 18 are required in the hole plate 17. The amount of index can be determined for the individual end use of the device and can be any amount within practical manufacturing limits. The hole plate 17 is integral with driven member spindle 19 which is rotatably mounted on the shaft 10 with bushing 20. The driven member 11 is fixed to the driven member spindle 19 by key 21. Two shaft collars 22 restrain the driven member spindle 19 and attached parts from moving axially along shaft 10. The drive pins 16 with the drive pin carrier 15 are normally held in engagement with the holes 18 of the hole plate 17 by a compression spring 23 thus preventing rotation of driven member spindle 19 on the shaft 10 in the normal driving mode.

To operate the mechanism, that is, to make one index, an axial movement to the right in FIG. 1 is imparted to the actuating ring 24. Said actuating ring is fixed to the outer race of a bearing 25 so that the actuating ring may be held stationary while the rest of the entire mechanism is rotating along with the shaft 10. This axial movement may be provided by manual or mechanical means which is not important to this description. Said axial movement, which is transmitted through the bearing 25 the inner race of which is fixed to the cage spindle 13, compresses cage return spring 23, moving the index pin 26 which is integral with the index ring 27 which in turn is fixed to the outer race of bearing 28, into engagement with a hole 18 of the hole plate 17. Simultaneously with the engagement of the index pin 26 with the hole plate 17, the drive pins 16 are disengaged from said hole plate. The index ring 27, being rotatably mounted on cage spindle 13 by means of bearing 28, along with the driven member spindle 19 and connected parts will now rotate relative to shaft 10 and in a direction opposite to the rotation of shaft 10 due to the resisting action of the external load on the driven member 11. This relative rotation is opposed only by the force of a light index spring 29, until said relative rotation is stopped by the index stop pin 30 which is integral with the index ring 27 contacting the end of the stop pin slot 31 which is contained in the cage spindle 13. This stop pin slot 31, which has the shape of a circular arc, has a sufficient length to allow the index pin 26 to rotate the exact angular distance between two adjacent holes 18 in the hole plate 17.

When the axial actuating force is removed, the cage return spring 23 urges the drive pin carrier 15 to the left in FIG. 1 thereby moving the drive pins 16 into engagement with holes 18 in the hole plate 17, said holes being the ones adjacent to the holes originally engaged by the drive pins, simultaneously disengaging the index pin 26. When said index pin is fully disengaged, the index spring 29 acts on the index pin 26 to rotate it along with the index ring 27 in the same direction as shaft 10 until this rotation is stopped by the index stop pin 30 contacting the forward end of the stop pin slot 31. The device has now returned to the original state and can be made to index at any time by means of another axial movement.

Having thus described this invention in one practical form thereof what I claim as novel and wish to secure by Letters Patent is as follows:

In an indexing mechanism, a cage assembly mounted for axial sliding movement on a driving shaft; a spindle mounting a driven member mounted for rotation on said shaft with said spindle normally prevented from rotation relative to said shaft by a plurality of drive pins slidably engaged in holes in a flange portion of said spindle, said pins normally held in engagement by spring means, said drive pins being integral parts of the cage assembly with the spacing of said holes in said spindle determining the amount of index in one operation of the device; at least one index pin rotatably mounted within said cage assembly with means for limiting this rotation to the same angular spacing of the holes in said spindle such that when an axial movement is applied to the cage assembly, disengaging the drive pins from said holes, said index pin simultaneously engages one of said holes and the driven member immediately indexes in the direction opposite to the driving shaft rotation due to the reaction of a load on said driven member; with spring means for restoring all parts to the normal driving mode when said axial operating force is removed.

References Cited in the file of this patent

UNITED STATES PATENTS

| | | |
|---|---|---|
| 1,312,277 | Shields et al. | Aug. 5, 1919 |
| 2,449,807 | Frei | Sept. 21, 1948 |
| 2,677,971 | Greenwood | May 11, 1954 |
| 2,680,993 | Osplack | June 15, 1954 |
| 2,739,488 | Harrison | Mar. 27, 1956 |